(12) United States Patent
Kuwamura

(10) Patent No.: US 8,084,971 B2
(45) Date of Patent: Dec. 27, 2011

(54) MOTOR DRIVE CIRCUIT AND DISC DEVICE USING THE SAME

(75) Inventor: Makoto Kuwamura, Kyoto (JP)

(73) Assignee: Rohm Co., Ltd. (JP)

( * ) Notice: Subject to any disclaimer, the term of this patent is extended or adjusted under 35 U.S.C. 154(b) by 700 days.

(21) Appl. No.: 12/090,910

(22) PCT Filed: Oct. 19, 2006

(86) PCT No.: PCT/JP2006/320834
§ 371 (c)(1),
(2), (4) Date: Apr. 21, 2008

(87) PCT Pub. No.: WO2007/046461
PCT Pub. Date: Apr. 26, 2007

(65) Prior Publication Data
US 2009/0121665 A1 May 14, 2009

(30) Foreign Application Priority Data
Oct. 20, 2005 (JP) .................. 2005-305995

(51) Int. Cl.
*H03K 5/00* (2006.01)
(52) U.S. Cl. ......... 318/400.13; 318/400.07; 318/400.11; 318/400.32
(58) Field of Classification Search ............. 318/400.13, 318/400.07, 400.11, 400.32
See application file for complete search history.

(56) References Cited

U.S. PATENT DOCUMENTS

| | | | |
|---|---|---|---|
| 5,661,382 A | 8/1997 | Enami et al. | |
| 6,433,359 B1 | 8/2002 | Kelley et al. | |
| 6,586,791 B1 | 7/2003 | Lee et al. | |
| 6,621,099 B2 | 9/2003 | Ong et al. | |
| 7,081,641 B2 | 7/2006 | Kawasaki et al. | |
| 2002/0171125 A1 | 11/2002 | Bao et al. | |
| 2003/0059984 A1 | 3/2003 | Sirringhaus et al. | |
| 2003/0102472 A1 | 6/2003 | Kelley et al. | |
| 2004/0075093 A1 | 4/2004 | Arai et al. | |
| 2004/0247814 A1 | 12/2004 | Sirringhaus et al. | |

FOREIGN PATENT DOCUMENTS

| | | |
|---|---|---|
| GB | 2373095 | 9/2002 |
| GB | 2379083 | 2/2003 |

(Continued)

OTHER PUBLICATIONS

European Search Report for European Patent Application No. 03028941.7-1235 mailed Sep. 25, 2007 (See Parent File U.S. Appl. No. 10/740,644).

H. Sirringhaus, et al., High-Resolution Inkjet Printing of All-Polymer Transistor Circuits, www.sciencemag.org, Dec. 15, 2000, vol. 290 (See Parent File U.S. Appl. No. 10/740,644.

(Continued)

*Primary Examiner* — Bentsu Ro
*Assistant Examiner* — Erick Glass
(74) *Attorney, Agent, or Firm* — Cantor Colburn LLP

(57) ABSTRACT

An energization signal generating circuit respectively compares back electromotive forces generated in coils of each phase of a motor with a midpoint voltage of each phase, and generates energization signals. A pulse signal generating circuit generates a pulse signal in which duty ratio is controlled according to torque. A ramp signal generating circuit divides, into a plurality of times, a period of a frequency generation signal obtained by synthesizing the energization signals, and, for each divided time unit, generates a ramp signal in which pulse width gradually changes, and which has a frequency the same as the pulse signal. An output circuit supplies a drive current to the coils of each phase, based on the energization signals, the pulse signal, and the ramp signal.

8 Claims, 5 Drawing Sheets

FOREIGN PATENT DOCUMENTS

| | | |
|---|---|---|
| JP | 57-7549 | 1/1982 |
| JP | 61-222179 | 10/1986 |
| JP | 3-207250 A | 9/1991 |
| JP | 6-165576 A | 6/1994 |
| JP | 10-243685 A | 9/1998 |
| JP | 2001-028891 A | 1/2001 |
| JP | 2002-119081 A | 4/2002 |
| JP | 2002-186275 A | 6/2002 |
| JP | 2003-282883 | 10/2003 |
| WO | 01/47045 | 6/2001 |

OTHER PUBLICATIONS

Office Action issued for Chinese Patent Application No. 200680038995.4 with English translation issued Feb. 12, 2010.
International Search Report for International Application No. PCT/JP2006/320834 mailed Jan. 23, 2007.
Written Opinion of the International Searching Authority for PCT/JP2006/320834 mailed Jan. 23, 2007.
Japanese Office Action, Notification of Reason(s) for Refusal for Japanese Patent Application No. 2005-305995 dispatched Jun. 28, 2011 with English Translation.

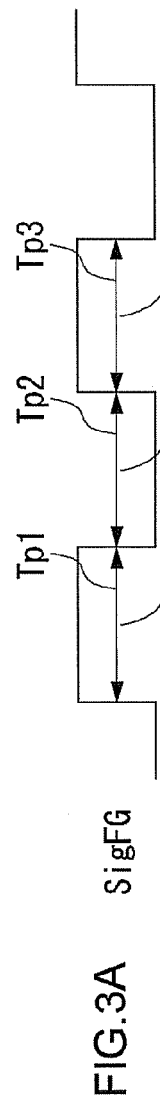
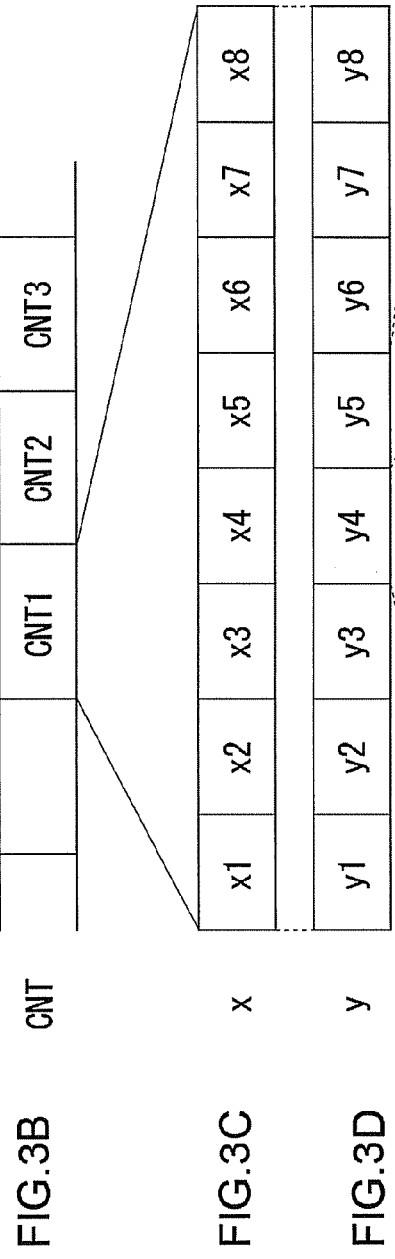
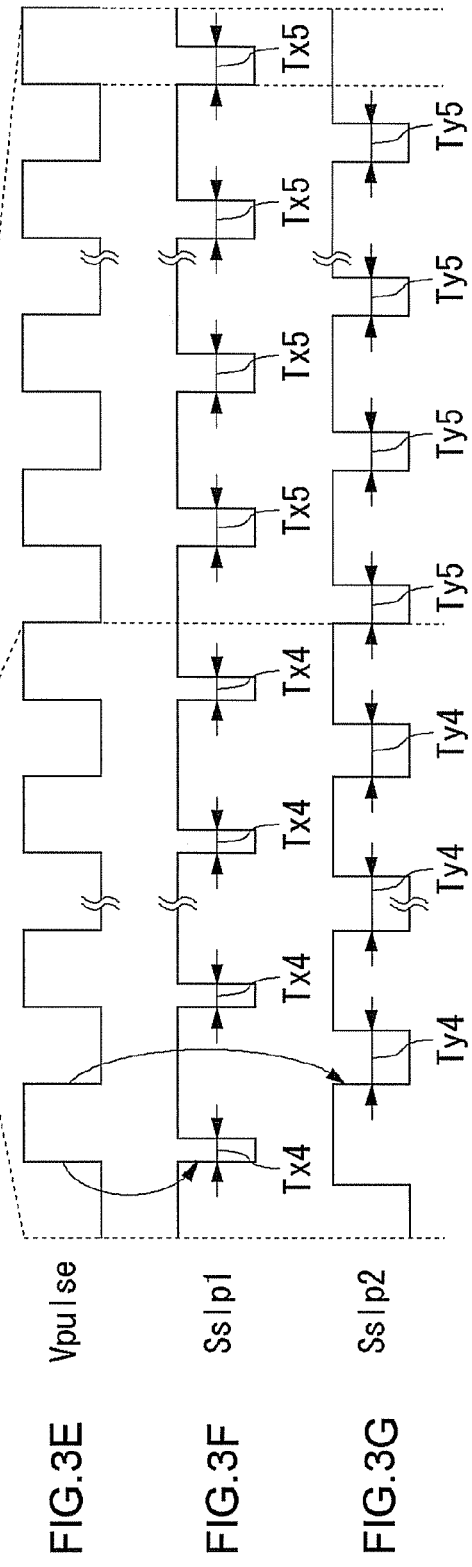

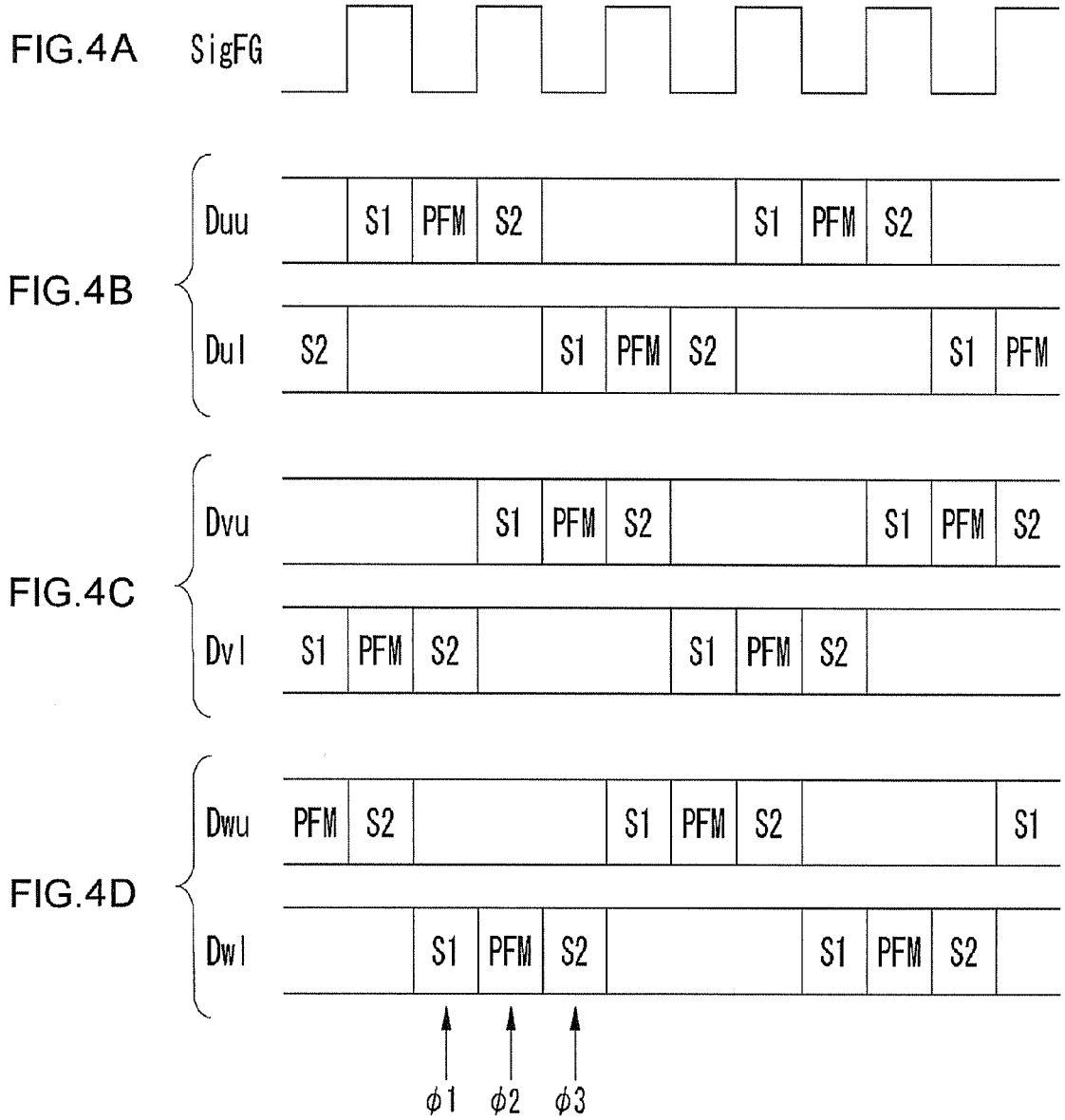

MOTOR DRIVE CIRCUIT AND DISC DEVICE USING THE SAME

CROSS REFERENCE TO RELATED APPLICATIONS

This is a U.S. national stage of application No. PCT/JP2006/320834, filed on 19 Oct., 2006. Priority under 35 U.S.C. §119(a) and 35 U.S.C. §365(b) is claimed from Japanese Application No. 2005-305995, filed 20 Oct. 2005, the disclosure of which is also incorporated herein by reference.

BACKGROUND OF THE INVENTION

1. Field of the Invention

The present invention relates to a motor drive circuit that controls rotation of a motor including a stator having a plurality of coils and a magnetic rotor, and especially to a motor drive circuit which drives a pulse.

2. Description of the Related Art

A brushless direct-current motor is used for rotating a disc in electronic devices using disc-type media such as portable CDs (Compact Disc), DVDs (Digital Versatile Disc), and the like. In general, the brushless direct-current (DC) motor is provided with a rotor having a permanent magnet, and a stator having a plurality of phase coils connected in a star configuration; the coils are excited by controlling a current supplied to the coils, and the rotor is driven by rotation relative to the stator. In order to detect the current rotation position of the rotor, the brushless DC motor is generally provided with a sensor such as a Hall element, an optical encoder, or the like, and the current supplying each phase coil is switched in accordance with the position detected by the sensor to give an appropriate torque to the rotor.

In order to downsize a motor, a sensorless motor has been proposed, which detects the rotation position of the rotor without using a sensor, such as a Hall element or the like (for example, refer to Patent Document 1). By measuring electrical potential at the midpoint of the wiring of the motor, for example, the sensorless motor detects induced voltage generated in the coils, and the motor and obtains positional information.

Patent Document 1: Japanese Patent Application, Laid Open No. H3-207250

Patent Document 2: Japanese Patent Application, Laid Open No. H10-243685

While driving this type of sensorless motor, in order to reduce noise generated by the motor, it is desirable that the current flowing in each phase coil should gently vary.

SUMMARY OF THE INVENTION

The present invention has been made in view of these problems, and a general purpose thereof is to provide a motor drive circuit in which the coil current can be gently varied.

An embodiment of the present invention relates to a motor drive circuit in which a drive current is supplied to a multiphase motor to drive the motor. The motor drive circuit includes: an energization signal generating circuit which compares a back electromotive force generated respectively in each phase coil of the multiphase motor with the midpoint voltage of each phase and which generates an energization signal; a pulse signal generating circuit which generates a pulse signal whose duty ratio is controlled according to torque; a ramp signal generating circuit which divides, into a plurality of times, the period (time) of a frequency generation signal obtained by synthesizing the energization signal and which, for each divided time unit generates a ramp signal whose pulse width gradually changes and whose frequency is the same as the pulse signal; and an output circuit which supplies a drive current to each phase coil of the multiphase motor according to the energization signal generated by the energization signal generating circuit, the pulse signal generated by the pulse signal generating circuit, and the ramp signal generated by the ramp signal generating circuit.

According to the embodiment, the ramp signal is generated according to the period of a frequency generation signal depending on the rotational frequency of the motor. Therefore, the speed of change of the pulse width of the ramp signal can be set according to the rotational frequency of the motor, and it is possible to preferably drive the motor with a wide range of rotational frequencies.

The output circuit selects a coil to be energized from each phase coil based on the energization signal, and in a certain phase the circuit may provide a signal to a control terminal of a transistor connected to one end of the selected coil, in response to a ramp signal in which pulse width gradually increases; in a following phase, the circuit may provide a signal in response to the pulse signal; and in a following phase thereof the circuit may provide a signal in response to a ramp signal in which pulse width gradually decreases.

According to this embodiment, by making the ON time of the transistor connected to the selected coil gradually longer, by subsequently controlling the ON time by a duty ratio that depending on torque, and after that, by making the ON time shorter, it is possible to gently change the current flowing in the coil in three continuous time-periods.

The output circuit may select a coil to be energized from each phase coil, based on the energization signal, the circuit may provide a signal, in response to a pulse signal to the control terminal of the transistor connected to one end of the selected coil, and the circuit may also provide a signal in response to a ramp signal, to the control terminal of a transistor connected via another coil to another end of the selected coil.

According to this embodiment, by driving one transistor arranged on a path of a coil in which a current is flowing in a certain phase with the pulse signal, and by driving another transistor with the ramp signal, it is possible to gently change the current flowing in the coil.

The ramp signal generating circuit may include a period measuring unit which measures a period of the frequency generation signal obtained by synthesizing the energization signal; a ramp setting unit which divides, into a plurality of times, a period of the energization signal measured by the period measuring unit and which sets a pulse width of a ramp signal for each divided time unit that elapses; and a ramp signal output unit which detects an edge of a pulse signal generated by the pulse signal generating circuit and, from the detected edge, outputs the ramp signal at a predetermined level in a time-period of the pulse width set by the ramp setting unit.

The multiphase motor may be a three-phase motor, and the output circuit may drive the multiphase motor by 180-degree energization. In such cases, the output circuit may provide a signal, in response to the pulse signal, to a control terminal of a transistor connected to one end of the selected coil; may provide a signal in response to the ramp signal in which the pulse width gradually increases, to a control terminal of one transistor among two transistors connected via another coil to another end of the selected coil; and may provide a signal in response to the ramp signal in which the pulse width gradually decreases, to the control terminal of the other transistor.

The pulse signal generating circuit may include a current-voltage converter which converts a drive current flowing in each phase coil of the multiphase motor into a voltage; a pulse modulation comparator which compares a detection voltage outputted from the current-voltage converter with a control voltage that prescribes torque; and an OFF time setting unit which refers to a comparison signal outputted from the pulse modulation comparator and, which generates a pulse signal that has a first level prescribing a non-energized state of each phase coil during a predetermined OFF time from when the detection voltage reaches a control voltage, and has a second level prescribing an energized state of each phase coil, at other time-periods.

The motor drive circuit may be monolithically integrated on one semiconductor substrate. "monolithically integrated" includes cases in which all component elements of the circuit are formed on the semiconductor substrate and includes cases in which main component elements of the circuit are integrated, and some resistors, capacitors, or the like, used for adjusting a circuit constant, may be arranged outside the semiconductor substrate. By integrating the motor drive circuit as one LSI, it is possible to reduce the circuit area.

Another embodiment of the present invention is a disc device. This disc device is provided with a spindle motor which is a multiphase motor that rotates a disc, and the above described motor drive circuit which drives the spindle motor. According to this embodiment, since it is possible to gently change the current flowing in a coil of the spindle motor, noise can be reduced.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A-3G are views showing aspects in which a ramp signal is generated in the ramp signal generating circuit;

FIGS. 4A-4D are time charts showing a control sequence of each transistor when 180-degree energization is performed.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Moreover, in the present specification, "member A and member B are connected" includes cases in which the member A and the member B are directly and physically connected and cases in which the member A and the member B are indirectly connected via another member that does not affect an electrical connection state, or if there is an effect, the effect is not substantial.

Figure 1:
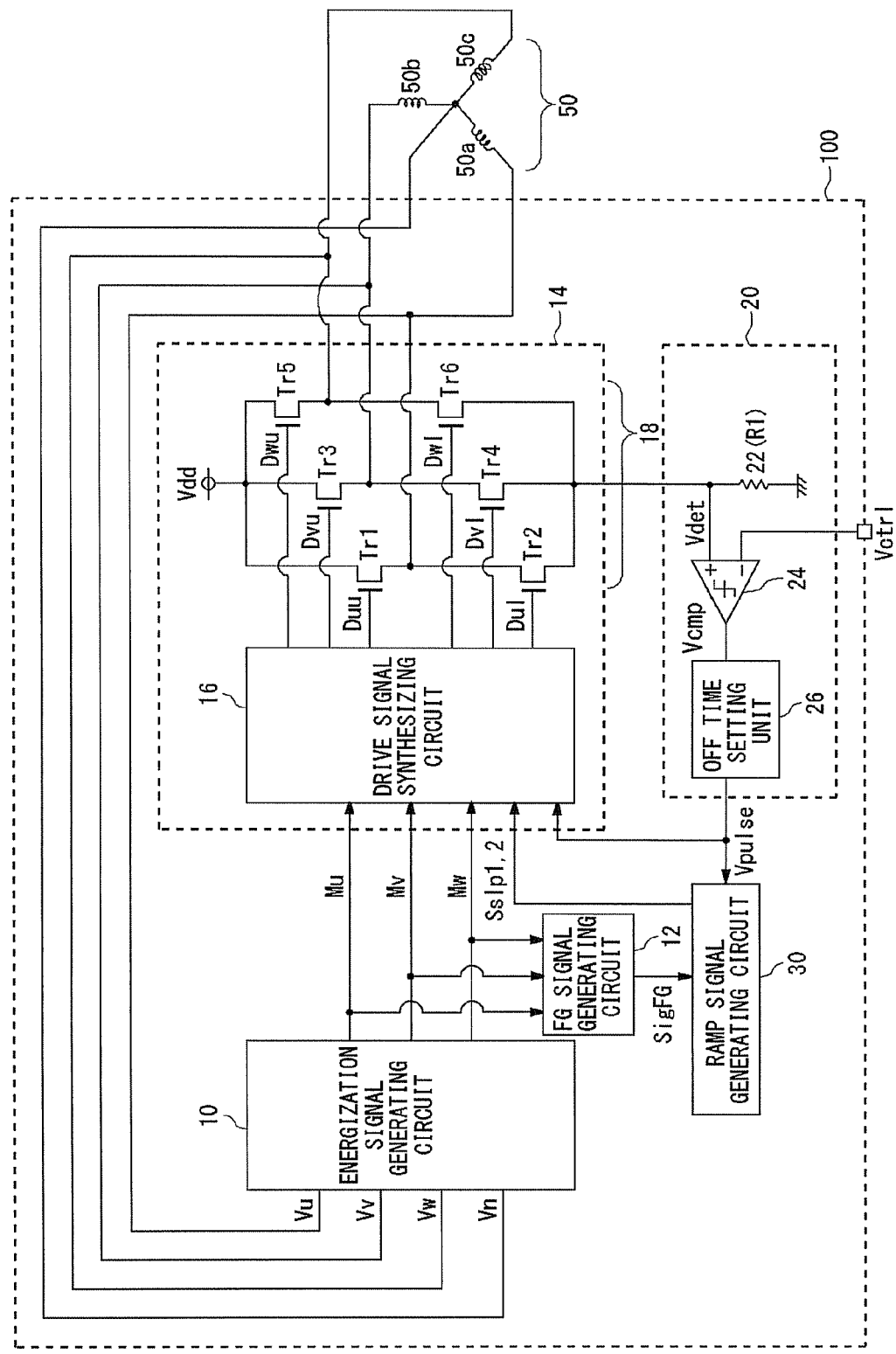
FIG. 1 is a circuit diagram showing a configuration of a motor drive circuit according to an embodiment.

FIG. 1 is a block diagram showing a configuration of a motor drive circuit 100 according to an embodiment. The motor drive circuit 100 supplies a drive current to a sensor-less, brushless DC motor (simply referred to below as a motor 50) by a pulse drive method, to control rotation. In the present embodiment, the motor 50 is a three-phase DC motor including coils 50a to 50c of phase U, phase V, and phase W.

The motor drive circuit 100 is provided with an energization signal generating circuit 10, a frequency generating circuit 12, an output circuit 14, a pulse signal generating circuit 20, and a ramp signal generating circuit 30. The motor drive circuit 100 is a function IC integrated as a unit on one semiconductor substrate.

The energization signal generating circuit 10 compares the back electromotive forces Vu, Vv and Vw generated respectively in coils 50a to 50c of each phase of the motor 50 with a midpoint voltage Vn of each phase, and generates energization signals Mu to Mw. The energization signal generating circuit 10 may be configured to include a reverse detection comparator which respectively compares the back electromotive forces Vu to Vw with the midpoint voltage Vn, and a mask circuit which eliminates noise from output of the reverse detection comparator.

The energization signal Mu has a high level when Vu>Vn, and a low level when Vu<Vn. In the same way, the energization signal Mv has a high level when Vv>Vn, and the signal has a low level when Vv<Vn; the energization signal Mw has a high level when Vw>Vn, and it has a low level when Vw<Vn.

The output circuit 14 supplies a drive current to the coils 50a to 50c of each phase of the motor 50 based on the energization signals Mu to Mw generated by the energization signal generating circuit 10, a pulse signal Vpulse generated by the pulse signal generating circuit 20 described later, and a ramp signal Sslp generated by the ramp signal generating circuit 30 described later. In the present embodiment, the output circuit 14 drives the motor 50 by a 180-degree energization method.

The output circuit 14 includes a drive signal synthesizing circuit 16 and a power transistor circuit 18. The power transistor circuit 18 is provided with six transistors Tr1 to Tr6 for switching, and the circuit 18 performs to determine which of the coils 50a to 50c is supplied with current by use of an ON-OFF combination of the transistors Tr1 to Tr6, in addition to performing pulse driving which regulates torque by controlling an ON-OFF time ratio. In the embodiment, each one of the transistors Tr1 to Tr6 is a MOSFET. One end of the transistors Tr1, Tr3, and Tr5 is connected in common to a power supply line by which a power supply voltage Vdd is applied, and another end is connected to the coils 50a, 50b, and 50c of each phase of the motor 50. One end of the transistors Tr2, Tr4, and Tr6 is connected to the transistors Tr1, Tr3, and Tr5 and the coils 50a, 50b, and 50c of each phase. The ON-OFF states of the transistors Tr1 to Tr6 are controlled by the drive signal synthesizing circuit 16.

The drive signal synthesizing circuit 16 performs synthesis by performing a logical operation on the energization signals Mu to Mw generated by the energization signal generating circuit 10, the pulse signal Vpulse outputted by the pulse signal generating circuit 20 described later, and the ramp signal Sslp outputted by the ramp signal generating circuit 30, to generate drive signals Duu and Dul, to be applied to gates of the transistors Tr1 to Tr6. That is, based on the energization signals Mu to Mw, a decision is made as to which group of transistors is turned ON and which coil is energized, and based on the pulse signal Vpulse, the ON-OFF time ratio is regulated and torque control is carried out. Furthermore, the ramp signal Sslp is used to gently change the drive current.

Next, an explanation is given concerning the configuration of the pulse signal generating circuit 20 that generates the pulse signal Vpulse. The pulse signal generating circuit 20 includes a current-voltage converter 22, a pulse modulation comparator 24, and an OFF time setting unit 26.

The pulse signal generating circuit 20 is arranged between the power transistor circuit 18 and ground. The current-voltage converter 22 is configured to include a conversion resistor R1. A voltage drop proportional to the drive current flowing in the coils 50a, 50b, and 50c of each phase of the motor 50 is generated in the conversion resistor R1. The current-voltage converter 22 outputs the voltage drop generated in the conversion resistor R1 as a detection voltage Vdet.

The detection voltage Vdet outputted from the current-voltage converter 22 is inputted to a non-inverting input terminal of the pulse modulation comparator 24. A control voltage Vctrl, prescribing a torque inputted from outside, is inputted to an inverting input terminal of the pulse modulation comparator 24. The pulse modulation comparator 24 compares the detection voltage Vdet outputted from the current-voltage converter 22 with the control voltage Vctrl. A comparison signal Vcmp outputted from the pulse modulation comparator 24 has a high level when Vdet>Vctrl, and has a low level when Vdet<Vctrl. The comparison signal Vcmp outputted from the pulse modulation comparator 24 is inputted to the OFF time setting unit 26.

The OFF time setting unit 26 refers to the comparison signal Vcmp outputted from the pulse modulation comparator 24, and the unit 26 outputs the pulse signal Vpulse, which has a low level (a first level) in a time-period from when the comparison signal Vcmp transits to a high level until a predetermined OFF time Toff has elapsed, and a high level (a second level) in other time-periods. In other words, the pulse signal Vpulse has a low level for the predetermined OFF time Toff from when the detection voltage Vdet reaches the control voltage Vctrl and has a high level in other time-periods. For example, the OFF time Toff is set to several μs, and more specifically, as an example, to 5.7 μs.

The OFF time setting unit 26 can, for example, be configured using a counter circuit which starts counting the OFF time Toff, at an occasion of a level transition of the comparison signal Vcmp. In such cases, the counter circuit outputs the pulse signal Vpulse, which has a low level for a time-period from the level transition of the comparison signal Vcmp until the count is completed, and thereafter transits to a high level.

Here, the low level (the first level) of the pulse signal Vpulse corresponds to a non-energization state of the coils 50a to 50c of each phase, and the high level (the second level) thereof corresponds to an energization state of the coils 50a to 50c of each phase. That is, by the pulse signal Vpulse repeatedly alternating between a high level and a low level, a current flows intermittently in the coils 50a to 50c of the motor 50 to carry out pulse driving.

In the pulse signal Vpulse generated in the motor drive circuit 100 according to the present embodiment, the OFF time Toff is constant, and the ON time changes according to the control voltage Vctrl, which prescribes the torque. That is, the motor 50 is pulse-driven by a pulse frequency modulation (PFM) method in which frequency thereof changes according to torque, with the OFF time constant.

The frequency generating circuit 12 synthesizes the energization signals Mu to Mw outputted from the energization signal generating circuit 10, to generate a frequency generating signal (referred to below as an FG signal) SigFG. This FG signal SigFG is a signal which switches from a high to a low level at each edge of the energization signals Mu to Mw, and, for example, the signal can be generated by an exclusive-OR computation of the energization signals Mu to Mw.

The ramp signal generating circuit 30 divides a period of the FG signal SigFG obtained by synthesizing the energization signals Mu to Mw into multiple time periods, and, for each divided time unit, the circuit 30 generates the ramp signal Sslp in which pulse width gradually changes. Frequency of this ramp signal Sslp is set to the frequency value as the same as the pulse signal Vpulse. In the present embodiment, the ramp signal generating circuit 30 generates a first ramp signal Sslp1 in which the pulse width gradually increases and generates a second ramp signal Sslp2 in which the pulse width gradually decreases.

Figure 2:
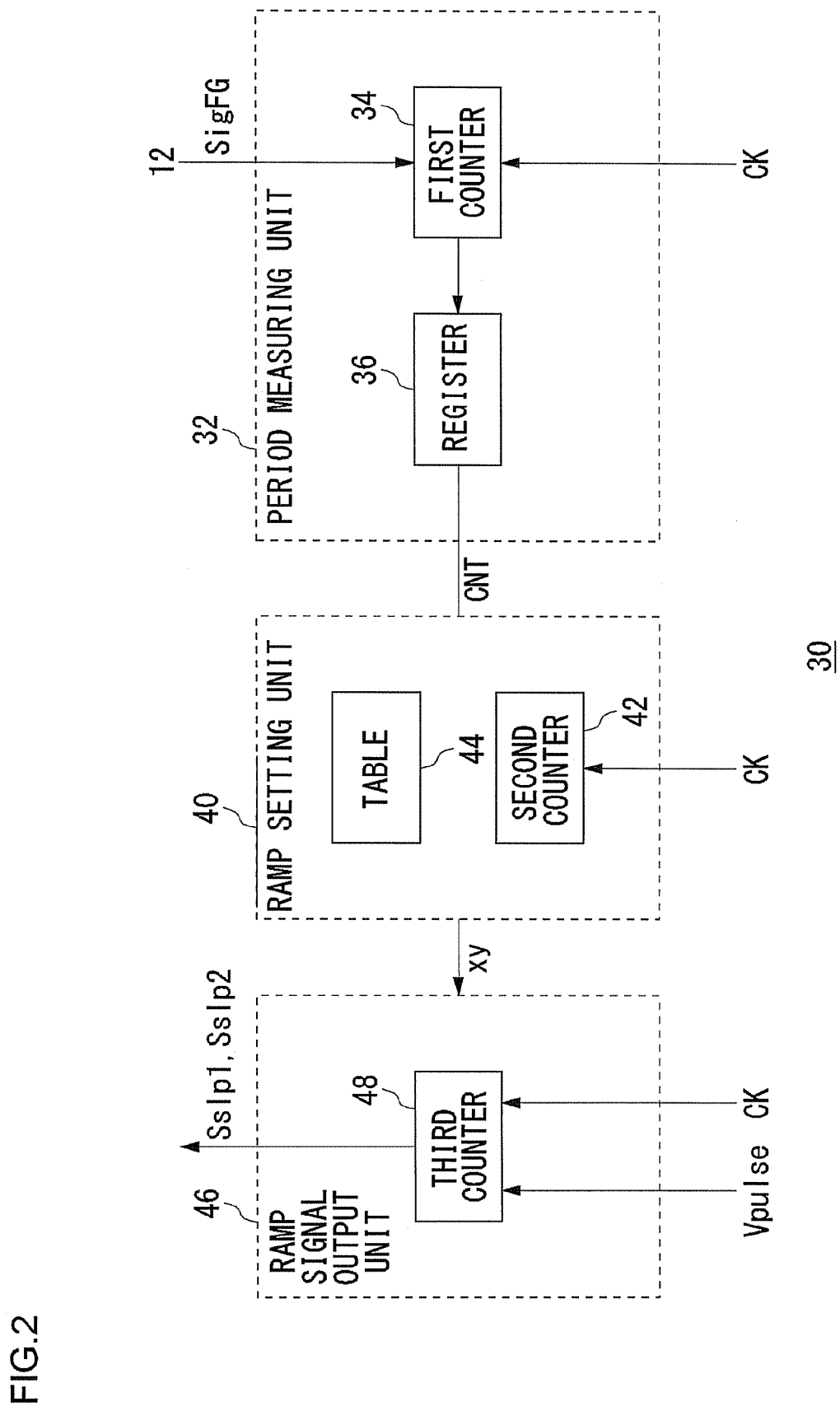
FIG. 2 is a block diagram showing a configuration example of a ramp signal generating circuit.

FIG. 2 is a block diagram showing a configuration example of the ramp signal generating circuit 30. The ramp signal generating circuit 30 includes a frequency measuring unit 32, a ramp setting unit 40, and a ramp signal output unit 46.

The frequency measuring unit 32 includes a first counter 34 and a register 36. The first counter 34 counts a clock signal CK inputted from outside. The FG signal SigFG is inputted to the first counter 34, a count value CNT is reset each time a signal level thereof is switched, and counting is restarted. Each time the first counter 34 is reset, the register 36 holds the count value CNT by the reset time sequentially. The count value CNT held in the register 36 is equivalent to a period Tp of the FG signal SigFG. The period here is an interval between the edges of the FG signal SigFG. A relationship Tp=CNT×Tck holds between the count value and the period Tp. Here, Tck is a period of the clock signal CK. In this way, the period measuring unit 32 measures the period Tp of the FG signal SigFG.

The ramp setting unit 40 divides the count value CNT held in the register 36 into multiple divisions. Below, an explanation is given with the number of divisions n=8, as an example. Furthermore, in order to simplify explanations here, equal divisions are used. The divided count values are given by CNT/8, and time units that have been divided into 8 are Tp/8.

The ramp setting unit 40 divides the period Tp into 8 equal divisions and assigns a pulse width Tx of the first ramp signal Sslp1, at each time each of the divided time units (Tp/8) elapses. The pulse width Tx of the first ramp signal Sslp1 is set to an identical value at each time unit and is set such that when the time unit changes, the pulse width Tx gently increases.

The ramp setting unit 40 includes a second counter 42 and a table 44. The second counter 42 counts the clock CK. When a count value cnt' of the second counter 42 is such that 0<cnt'<CNT×1/8, the pulse width of the first ramp signal Sslp1 is set to Tx1. When the count value cnt' is such that CNT×1/8<cnt'<CNT×2/8, the pulse width of the ramp signal Sslp is set to Tx2. In the same pattern, when the count value cnt' is such that CNT×(i−1)/8<cnt'<CNT×i/8, the pulse width of the first ramp signal Sslp1 is set to Txi.

The table 44 holds data x1 to x8, consisting the values of the pulse widths Tx1 to Tx8 converted to a clock count. That is, a relationship Tx=x1×Tck between the pulse widths Tx1 to Tx8 and the data x1 to x8 respectively holds. Here, Tck is a period of the clock signal CK. The data x1 to x8 are set such that a relationship x1>x2>x3> . . . >x8 holds.

In the same way, the ramp setting unit 40 generates data y corresponding to the pulse width of the second ramp signal Sslp2 in which the pulse width decreases with each time unit. The pulse widths for each time unit of the second ramp signal Sslp2 are Ty1 to Ty8, and each width's data corresponds to a clock count of y1 to y8. The data y1 to y8 are set such that the relationship y1<y2<y3< . . . <y8 holds.

The ramp setting unit 40 outputs, to the ramp signal output unit 46, the data x and y corresponding to the pulse widths Tx and Ty set for the first ramp signal Sslp1 and the second ramp signal Sslp2, for each time unit.

The ramp signal output unit 46 includes a third counter 48, and a pulse signal Vpulse and a clock are inputted. The third counter 48 starts a count when the negative edge of the pulse signal Vpulse is inputted, and it outputs the first ramp signal Sslp1 that has a low level during a time-period until a count of x times, and has a high level in other time-periods. Furthermore, the third counter 48 starts a count when the positive edge of the pulse signal Vpulse is inputted, and it outputs the second ramp signal Sslp2 that has a low level during a time-period until a count of y times, and has a high level in other time-periods.

In this way, the ramp signal output unit 46 detects the edge at which the pulse signal Vpulse transits from low level, that prescribes a non-energization state of each phase coil, to a high level, that prescribes an energization state, and from the detected edge, it outputs the first ramp signal Sslp1 and the second ramp signal Sslp2 having high level time-periods of the pulse widths Tx and Ty set by the ramp setting unit 40.

The ramp signal generating circuit 30 shown in FIG. 2 may be configured such that the first counter 34, the second counter 42, and the third counter 48 are shared. A function equivalent to the ramp signal generating circuit 30 can be configured in various forms using well-known digital logic circuits or analog circuit technology, and the function may also be configured by other forms of circuits.

FIGS. 3A-3G are views that show the first ramp signal Sslp1 and the second ramp signal Sslp2 are generated in the ramp signal generating circuit 30. FIG. 3A shows the FG signal SigFG, FIG. 3B shows the count value CNT held in the register 36, FIG. 3C shows the data x corresponding to the pulse widths Tx, FIG. 3D shows the data y corresponding to the pulse widths Ty, FIG. 3E shows the pulse signal Vpulse, FIG. 3F shows the first ramp signal Sslp1, and FIG. 3G shows the second ramp signal Sslp2.

As shown in FIG. 3A, the FG signal SigFG is a signal that repeatedly alternates between a high level and a low level. The first counter 34 measures the period Tp, thereof, for each level transition of the FG signal SigFG. The measured period Tp is held in the register 36, as shown in FIG. 3B. A time-period for which the resister 36 holds counter value CNT1 is divided into eight sections. As shown in FIGS. 3C and 3D, different data from x1 to x8 and from y1 to y8 are assigned for each divided time unit.

FIGS. 3E-3G show enlargements of a fourth time unit and a fifth time unit. As shown in FIG. 3F, the first ramp signal Sslp1 has a low level from the positive edge of the pulse signal Vpulse in FIG. 3E, while a constant time-period. In the fourth time unit, the low level time-period is set to Tx4, and in the fifth time unit, the low level time-period is set to Tx5.

As shown in FIG. 3G, the second ramp signal Sslp2 has a low level from the negative edge of the pulse signal Vpulse in FIG. 3E, for a constant time-period. In the fourth time unit, the low level time-period is set to Ty4, and in the fifth time unit, the low level time-period is set to Ty5.

Viewing the first ramp signal Sslp1 generated in this manner, through the eight divided time units, the signal has a low level time-period that gradually becomes longer. Conversely, the second ramp signal Sslp2 is a signal in which the low level time-period gradually becomes shorter.

Returning to FIG. 1, the output circuit 14 supplies the drive current to the coils 50a to 50c of each phase of the motor 50 based on the energization signals Mu to Mw, the pulse signal Vpulse, the first ramp signal Sslp1, and the second ramp signal Sslp2.

An explanation is given below concerning the operation of the motor drive circuit 100 configured as described above.

The output circuit 14 selects a coil to be energized from the coils 50a to 50c of each phase, based on the energization signals Mu to Mw. Furthermore, a signal in response to the pulse signal Vpulse is given to a control terminal of a transistor connected to one end of the selected coil, and, in addition, a signal in response to the first ramp signal Sslp1 and the second ramp signal Sslp2 is given to a control terminal of a transistor connected via another coil to another end of the selected coil.

As described above, the output circuit 14 intermittently supplies the drive current to the coils 50a to 50c of each phase of the motor 50, based on the energization signals Mu to Mw of each phase and the pulse signal Vpulse. The drive signal synthesizing circuit 16 synthesizes the energization signals Mu to Mw, the pulse signal Vpulse, the first ramp signal Sslp1, and the second ramp signal Sslp2 by a logical operation, to generate drive signals Duu and Dul to be applied to the gates of the transistors Tr1 to Tr6.

FIGS. 4A-4D are time charts showing a control sequence of each transistor Tr1 to Tr6 when 180-degree energization is performed. FIG. 4A shows the FG signal SigFG, FIG. 4B shows the drive signals Duu and Dul which control energization of the coil 50a of phase U, FIG. 4C shows drive signals Dvu and Dvl which control energization of the coil 50a of phase V, and FIG. 4D shows drive signals Dwu and Dwl which control energization of the coil 50a of phase W.

In FIGS. 4A-4D, the time-period shown by S1 indicates that each drive signal D is generated based on the first ramp signal Sslp1. In the same way, the time-period shown by S2 indicates that each drive signal D is generated based on the second ramp signal Sslp2. Furthermore, the time-period shown by PFM indicates that each drive signal D is generated based on the pulse signal Vpulse.

A duty ratio of each drive signal is controlled, with sequences shown by S1, PFM, and S0 as drive units. For example, focusing on the drive signal Dw1 that controls the transistor Tr6 in a time-period $\phi 1$, it becomes clear that since duty ratio is determined based on the first ramp signal Sslp1, an ON time-period of the transistor Tr6 gradually becomes longer with time. Furthermore, in a time-period $\phi 2$, the duty ratio is controlled based on the pulse signal Vpulse, and the torque of the motor is regulated. Next, in a time-period $\phi 3$, the duty ratio is determined based on the second ramp signal Sslp2, and the ON time-period of the transistor Tr6 gradually becomes shorter with time.

This section focuses upon time-period $\phi 1$ in FIG. 4. In this time-period $\phi 1$, the transistor Tr1 on a high side, connected to the coil 50a of phase U, is pulse-driven based on the pulse signal Vpulse. A current flowing in the coil 50a of phase U flows into the coils 50b and 50c of phase V and phase W via the transistor Tr1. In the time-period $\phi 1$, the transistor Tr4 on a low side, connected to the coil 50b of phase V, is driven based on the second ramp signal Sslp2, and the transistor Tr6 on a low side, connected to the coil 50c of phase W, is driven based on the first ramp signal Sslp1.

Figure 5:
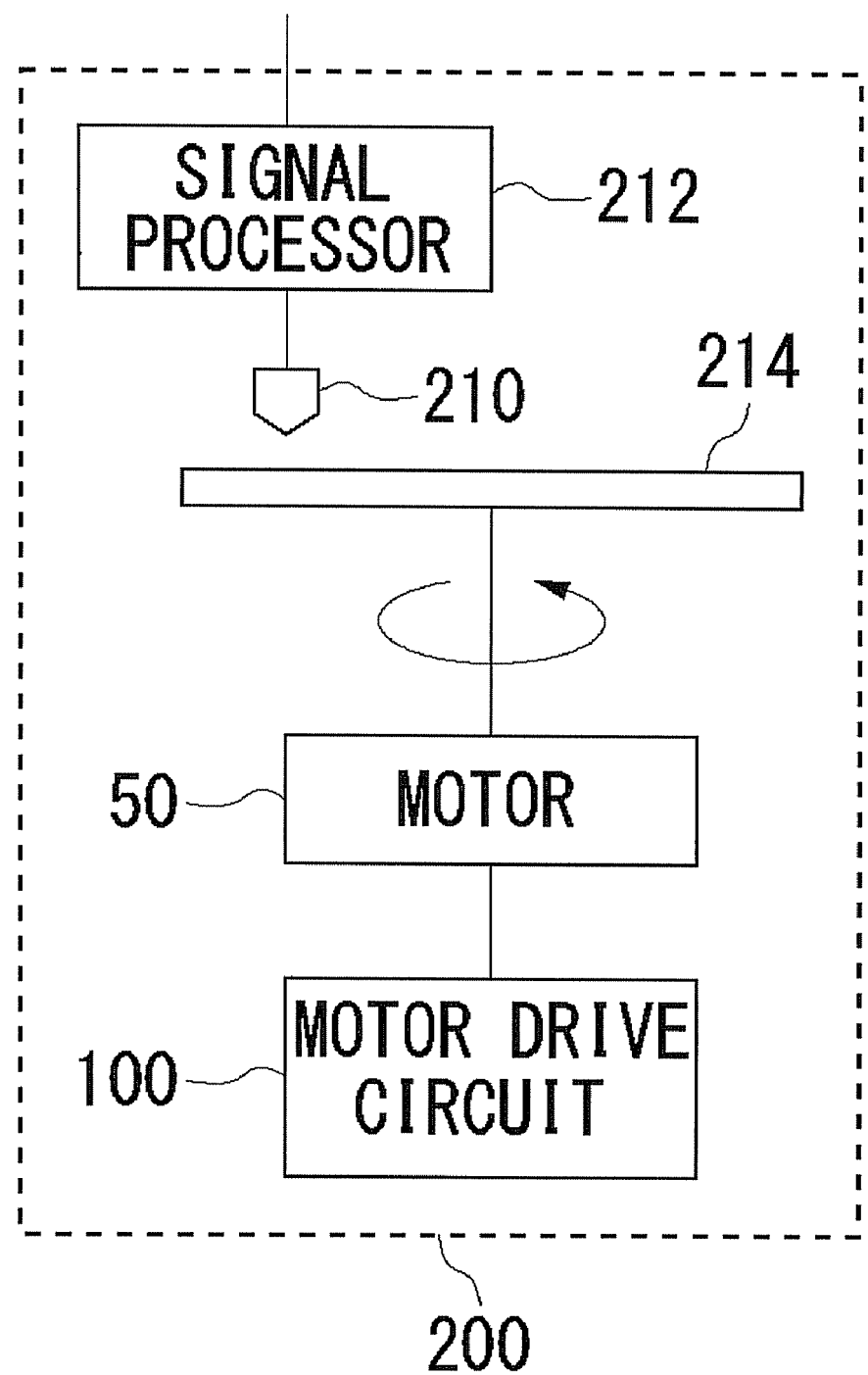
FIG. 5 is a block diagram showing a configuration of a disc device in which the motor drive circuit of FIG. 1 is installed.

Finally, this section gives an explanation concerning an application of the motor drive circuit 100 according to the present embodiment. FIG. 5 is a block diagram showing a configuration of a disc device 200 in which the motor drive circuit 100 of FIG. 1 is installed. The disc device 200 is a unit that performs recording and reproduction processing for an optical disc such as a CD, DVD, or the like, and is the device installed in an electronic device such as a CD player, a DVD player, a personal computer, or the like. The disc device 200 includes a pickup 210, a signal processor 212, a disc 214, a motor 50, and a motor drive circuit 100.

The pickup 210 radiates a laser on the disc 214 to read the desired data, or it reads data written on the disc 214 by reading reflected light. The signal processor 212 performs amplification processing on data to be read or written by the pickup 210, and it performs necessary signal processing such as A/D conversion, D/A conversion, or the like. The motor 50 is a spindle motor provided in order to rotate the disc 214. Since the disc device 200, such as shown in FIG. 5 in particular, is required to be small, a sensorless type that does not use a Hall element or the like is used as the motor 50. The motor drive circuit 100 according to the present embodiment can be used preferably in order to stably drive this type of sensorless spindle motor.

According to the motor drive circuit 100 according to the present embodiment, it is possible to obtain effects as below.

In the motor drive circuit 100 according to the present embodiment, the first ramp signal Sslp1 and the second ramp signal Sslp2 are generated, based on the FG signal SigFG, by the ramp signal generating circuit 30. As a result, in cases in which rotational frequency of the motor changes, since the pulse width of a ramp signal changes in response to the change in the rotational frequency, it is possible to gently change the current flowing in the coils, within a wide rotational frequency range.

In the motor drive circuit 100 according to the present embodiment, a transistor that controls energization of a certain coil is turned ON and OFF, first based on the first ramp signal Sslp1, subsequently based on the pulse signal Vpulse that determines the torque, and subsequently based on the second ramp signal Sslp2. As a result, the ON time of the transistor gently increases or decreases, and it is possible to gently change the current flowing in the coil. Furthermore, it is possible to decrease sound and noise caused by the back electromotive force in the motor.

In the motor drive circuit 100, according to the present embodiment, a signal in response to the pulse signal Vpulse is given to the control terminal of the transistor connected to one end of the selected coil, and at the same time, a signal is given in response to the ramp signal to a control terminal of a transistor connected via another coil to another end of the selected coil. Furthermore, in the embodiment in which 180-degree energization is carried out, two coils at the other end are energized, and among two transistors connected to the two coils, one is controlled by the first ramp signal, and the other is controlled by the second ramp signal. As a result, it is preferable to possibly implement 1:2 energization.

The present invention has been explained above, based on the embodiment. This embodiment is an example; various modified examples with combinations of various component elements and various processes thereof are possible, and a person skilled in the art will understand that such modified examples are within the scope of the present invention.

In the embodiment, the explanation given concerns cases in which a three phase motor is driven, but the present embodiment can be preferably used also for driving sensorless motors that are not three phase types. Furthermore, the energization method is not limited to 180-degree energization, and the method can also be applied to 120-degree energization.

The setting of high level and low level logic signals explained in the embodiment is one example; various modified examples can be envisioned in configurations of logic circuit blocks, and such modified examples are included in the scope of the present invention.

In the embodiment, the explanation is given concerning cases in which the motor drive circuit 100 is integrated as a unit but there is no limitation thereto, and, for example, the transistors Tr1 to Tr6 which form the power transistor circuit 18 and the conversion resistor R1 may be arranged as discrete elements or chip parts outside the motor drive circuit 100.

In the embodiment, the ON time of the transistors of the power transistor circuit 18 was controlled by PFM control, but there is no limitation thereto, and PWM control may also be performed.

The present invention has been explained based on the embodiment; however, the embodiments merely show principles and applications of the present invention, and many modified examples and changes to arrangements are possible within a scope that does not depart from the spirit of the present invention as prescribed in the scope of the claims.

The invention claimed is:

1. A motor drive circuit which supplies a drive current to a multiphase motor to drive the motor, the circuit comprising:
   an energization signal generating circuit which respectively compares a back electromotive force generated in each phase coil of the multiphase motor, with a midpoint voltage of each phase, and which generates an energization signal;
   a pulse signal generating circuit which generates a pulse signal whose duty ratio is controlled according to torque;
   a ramp signal generating circuit which divides, into a plurality of times, a period of a frequency generation signal obtained by synthesizing the energization signal and, which for each divided time unit, generates a ramp signal whose pulse width gradually changes and whose frequency is the same as the pulse signal; and
   an output circuit which supplies a drive current to each phase coil of the multiphase motor based on the energization signal generated by the energization signal generating circuit, the pulse signal generated by the pulse signal generating circuit, and the ramp signal generated by the ramp signal generating circuit; wherein the output circuit selects a coil to be energized from phase coils of the multiphase motor, based on the energization signal, and in a first period the output circuit provides an output circuit signal in response to the ramp signal in which pulse width gradually increases to a control terminal of a transistor connected to one end of the selected coil; in a second period the output circuit provides the output circuit signal in response to the pulse signal; and in a third period the output circuit provides the output circuit signal in response to the ramp signal in which pulse width gradually decreases.

2. The motor drive circuit according to claim 1, wherein the output circuit selects a coil to be energized from each phase coil, based on the energization signal, and the circuit provides a first output circuit signal in response to the pulse signal to a control terminal of a transistor connected to one end of the selected coil, and also provides a second output circuit signal in response to the ramp signal, to a control terminal of a transistor connected via another coil to another end of the selected coil.

3. The motor drive circuit according to claim 1, wherein the ramp signal generating circuit comprises:
   the period measuring unit which measures a period of the frequency generation signal;

a ramp setting unit which divides, into a plurality of times, the period measured by the period measuring unit, and sets a pulse width of the ramp signal, for each divided time unit that elapses; and a ramp signal output unit which detects an edge of a pulse signal generated by the pulse signal generating circuit and, from the detected edge, outputs the ramp signal at a predetermined level in a time-period of the pulse width set by the ramp setting unit.

4. The motor drive circuit according to claim 1, wherein the multiphase motor is a three-phase motor, and
the output circuit drives the multiphase motor by 180-degree energization.

5. The motor drive circuit according to claim 4 wherein the output circuit:
provides a first output circuit signal in response to the pulse signal, to a control terminal of a transistor connected to one end of a selected coil;
provides a second output circuit signal in response to a ramp signal, in which pulse width gradually increases, to a control terminal of one transistor among two transistors connected via another coil to another end of the selected coil; and
provides a third output circuit signal in response to the ramp signal, in which the pulse width gradually decreases, to a control terminal of another transistor.

6. The motor drive circuit according to claim 1, wherein the pulse signal generating circuit comprises:
a current-voltage converter which converts the drive current flowing in each phase coil of the multiphase motor into a detection voltage;
a pulse modulation comparator which compares the detection voltage outputted from the current-voltage converter with a control voltage that prescribes torque; and
an OFF time setting unit which refers to a comparison signal outputted from the pulse modulation comparator, and generates the pulse signal that has a first level prescribing a non-energized state of each phase coil during a predetermined OFF time from when the detection voltage reaches the control voltage, and which has a second level prescribing an energized state of each phase coil at other time-periods.

7. The motor drive circuit according to claim 1, wherein the motor drive circuit is integrated as a unit on one semiconductor substrate.

8. A disc device comprising:
a spindle motor which is the multiphase motor that rotates a disc; and
the motor drive circuit according to claim 1, the motor driving the spindle motor.

* * * * *